March 19, 1940.   C. S. ASH   2,194,199

DUAL WHEEL VEHICLE

Filed May 26, 1937

INVENTOR
CHARLES S. ASH
BY
Morgan, Finnegan and Durham
ATTORNEYS

Patented Mar. 19, 1940

2,194,199

UNITED STATES PATENT OFFICE 2,194,199

DUAL WHEEL VEHICLE

Charles S. Ash, Milford, Mich.

Application May 26, 1937, Serial No. 144,818

3 Claims. (Cl. 280—124)

The present invention relates to new and useful improvements in dual wheeled road vehicles and more particularly to heavy duty dual wheeled automotive or trailer vehicles in which the wheels are mounted so as to always remain perpendicular to the road surface.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrate one embodiment of the invention, and together with the description, serve to explain the principles of the invention.

Figure 1:
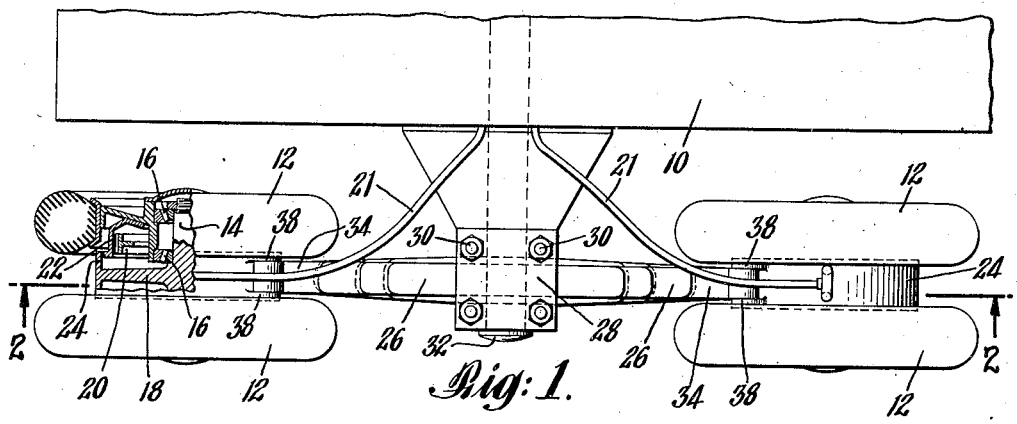
Figure 1 is a fragmentary plan view of an illustrative embodiment of the present invention with certain parts broken away to show the interior construction.
Figure 2:
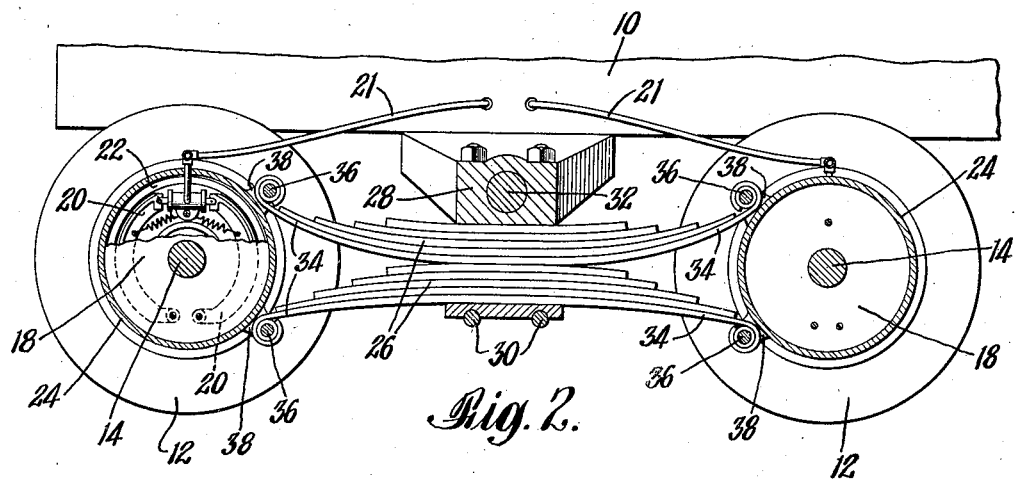
Figure 2 is a vertical sectional view taken on the line 2—2 of Figure 1.

The present invention has for its object the provision of a novel and improved dual wheel mechanism particularly adapted for use in connection with heavy duty vehicles, and in which the dual wheels are adapted always to remain perpendicular to the road surface at their points of contact therewith. A further object of the invention is the provision of an improved automatic cambering, dual wheeled structure which is simpler and necessitates the use of fewer parts than has heretofore been necessary. Still another object of the invention is the provision of a dual wheeled vehicle in which springs provide for the support of the body and load on the wheels and at the same time permit the axes of the dual wheels to move out of parallelism with each other.

As embodied, there are provided a plurality of sets of dual wheels, which wheels are preferably independently rotatable with respect to each other, and these wheels support the body by means of cantilever springs which are mounted on the body and are attached to the dual wheels between the wheels of each set, the connection between the wheels and the body through the springs being such that the axes of the sets of dual wheels are not held parallel to each other, although the wheels of each set may be so held. Preferably, there are provided two sets of dual wheels, mounted one in front of the other, by means of pairs of cantilever springs, and springs being centrally attached to the body or chassis by means of a trunnion, while the ends of the springs are attached to a disc-like structure between the dual wheels of each set so that the two sets of alined dual wheels are held at a substantially constant distance from each other. As embodied, the invention eliminates the necessity of employing an axle extending across the body or chassis of the vehicle, and thereby the body or chassis may be lowered with respect to the road, and a great number of parts, heretofore necessary in connection with automatic cambering of dual wheels are eliminated, thereby rendering the structure, simpler, cheaper to construct, and more economical in service.

It will be understood that the foregoing general description and the following detailed description as well are exemplary and explanatory of the invention but are not restrictive thereof.

Referring now in detail to the illustrative embodiment of the present invention as shown by the accompanying drawing there is shown only a small portion of one side of the vehicle, it being understood that the other wheels necessary or desired may be mounted in a similar or other manner. The chassis 10 may be of any conventional construction, and is adapted to be supported on the road by means of two or more sets of wheeled structures, each wheeled structure comprising two sets of dual wheels 12. Each of the dual wheels comprises two wheels supported in axial alinement, while the two sets are spaced one in front of the other on one side of the vehicle and a similar arrangement may be provided on the other side of the vehicle.

The dual wheels 12 are rotatably mounted for independent rotation on spindles 14 by means of anti-friction bearings 16, and these spindles project substantially horizontally from opposite sides of a disc-like web 18 which carries the brake mechanism and forms the brake backing plate on which the brake shoes 20 and actuating mechanism are supported. A cable or brake hose 21 may be provided for transmitting the actuating force. These brake shoes are adapted to bear against the brake drums 22 in the usual manner, and as the brake structure may be of conventional form, it is not shown in detail. The peripheral edge of the disc-like web 18 is preferably rimmed, as at 24, so as to provide a substantial closure and prevents easy access of dirt to the brake mechanism.

The spring suspension of the vehicle comprises a pair of cantilever spring assemblies 26, each comprising a plurality of leaves, and these are secured together and to the chassis by means of the pivoted spring seat 28, positioned centrally of the leaves, the leaves being held thereto by means of the U-bolts 30. The spring seats 28 are journalled on a laterally projecting trunnion 32 extending from the side rails of the chassis 10 a sufficient distance to allow the wheels 12 to clear the chassis 10.

Figure 3:
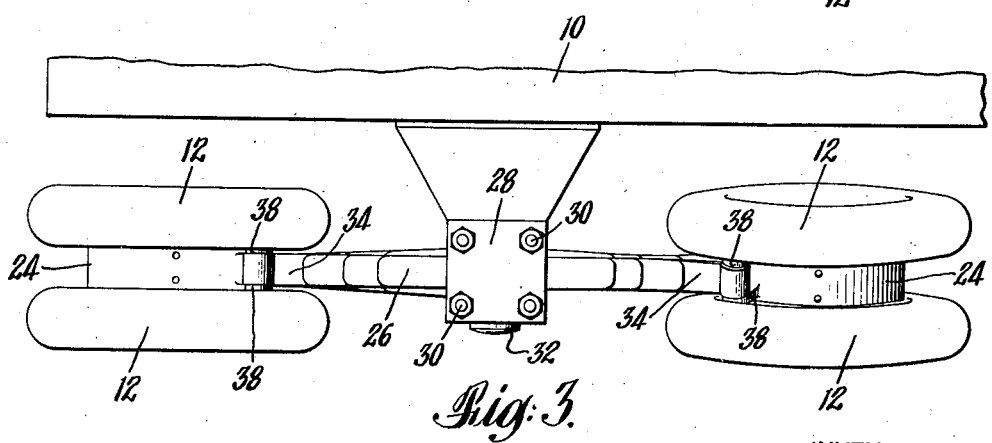
Figure 3 is a plan view of the device shown in Figure 1, with one pair of dual wheels distorted from its normal position so as to remain perpendicular to the road.

The spring suspension is attached to the wheels through the spring leaf ends and the disc-like webs, and as embodied, the longest leaf 34 of each spring assembly is rolled to provide an eye through which passes a shackle-bolt 36 securely fastened between the lugs 38 projecting radially from and formed integrally with the rim of the disc-like web 18. Thus there is formed a triangle having resilient sides giving the set of dual wheels a definite normal position, but allowing them to yield under road irregularities, and this yielding may be by twisting out of the usual and conventional vertical plane of wheel movement. Thus, and as shown in Figure 3 of the drawing, the wheels are free to move in pairs out of a plane parallel to the planes of the other sets of wheels and thereby each set of dual wheels may remain perpendicular to the road at all times. The sets of dual wheels are also independently resiliently movable with respect to the road, and road shocks are minimized due also to the fact that one set of wheels in passing over a road irregularity lifts the chassis only half that distance through which the wheels are raised. Also, in remaining perpendicular to the road, there is no free pivoting of the wheel which must be eventually positively limited on any excessive angular movement, but rather the wheels are always restrained to return to a normal parallel position, and thus in going over irregular ground, the set of dual wheels does not have any definite and positive limit to its automatic cambering action.

The servicing of brakes, and the changing of tires is easily accomplished on a heavy duty vehicle of the illustrative type, as the wheels are individually accessible and removable, and in removing a wheel, the other wheels tend to remain in an essentially vertical position. Thus, lifting of the relatively heavy wheels and tires through large distances is avoided.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheeled structure for road vehicles including in combination a vehicle frame, a trunnion mounted thereon, a leaf spring centrally and pivotally mounted on the trunnion, two pairs of dual wheels, one pair at each end of the spring, said spring being positioned between the wheels of each dual set, a pair of members on which the pairs of wheels are rotatably mounted, means for connecting the spring to the members with one member at each end of the spring, the pivotal axis of the spring at its connection with each respective member and the axis of the mounting of the wheels thereon being substantially parallel at all times whereby angular movement of the wheels is allowed when the spring is twisted.

2. A dual wheeled structure for road vehicles including in combination a vehicle frame, a trunnion mounted thereon, a leaf spring centrally and pivotally mounted on the trunnion, two pairs of dual wheels, members on which the pairs of dual wheels are independently rotatably mounted, one member at each end of the spring and positioned between adjacent dual wheels whereby the wheels may move vertically and remain perpendicular to the road, said members being directly pivotally mounted on the spring ends, the axis of the pivotal mounting of the spring on each respective member and the axis of the rotatable mounting of the wheels thereon being substantially parallel at all times and braking means carried by said members and cooperating with all of said wheels.

3. A dual wheeled structure for road vehicles including in combination a vehicle frame, a dual wheeled assembly comprising a resilient member connected to the frame, a pair of rotatable, axially aligned, spaced apart dual wheels pivotally attached to each end of said resilient member, said member forming the connection between the pairs of wheels and said frame, and permitting vertical movement of the wheels, the axis of each respective pair of wheels and the axis of the corresponding pivotal connection of the wheels with the resilient member being substantially parallel at all times, whereby angular movement of the wheels out of the vertical plane will be transmitted to the resilient member and distort the same, said resilient member also serving to restrain such angular movement of the wheels, and adapted to restore the wheels to a vertical position.

CHARLES S. ASH.